United States Patent
Oldham et al.

(10) Patent No.: US 7,782,838 B2
(45) Date of Patent: Aug. 24, 2010

(54) INTERMEDIATE PACKETIZING OF VOICE DATA FOR COMMUNICATION BETWEEN CIRCUIT-SWITCHED NETWORK NODES

(75) Inventors: Michael D. Oldham, San Jose, CA (US); Christopher C. Jones, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1228 days.

(21) Appl. No.: 10/602,444

(22) Filed: Jun. 24, 2003

(65) Prior Publication Data

US 2004/0264438 A1    Dec. 30, 2004

(51) Int. Cl.
*H04L 12/66* (2006.01)
*H04M 3/00* (2006.01)
*H04M 5/00* (2006.01)

(52) U.S. Cl. .................. 370/352; 370/353; 370/354; 370/355; 370/356; 379/265.09

(58) Field of Classification Search ............ 370/352, 370/356, 401, 353, 354, 355; 709/224; 710/6; 379/265.04, 269, 265.09
See application file for complete search history.

(56) References Cited

U.S. PATENT DOCUMENTS

| | | | | |
|---|---|---|---|---|
| 5,960,073 | A * | 9/1999 | Kikinis et al. | 379/265.04 |
| 6,061,347 | A * | 5/2000 | Hollatz et al. | 370/352 |
| 6,614,783 | B1 * | 9/2003 | Sonesh et al. | 370/352 |
| 6,674,746 | B1 * | 1/2004 | Lamarque, III | 370/352 |
| 6,678,266 | B1 * | 1/2004 | Hollatz et al. | 370/352 |
| 6,704,412 | B1 * | 3/2004 | Harris et al. | 379/269 |
| 6,985,943 | B2 * | 1/2006 | Deryugin et al. | 709/224 |
| 2003/0002479 | A1 * | 1/2003 | Vortman et al. | 370/352 |
| 2004/0032863 | A1 * | 2/2004 | Schoeneberger | 370/356 |
| 2004/0059841 | A1 * | 3/2004 | Bateman et al. | 710/6 |
| 2004/0141508 | A1 * | 7/2004 | Schoeneberger et al. | 370/401 |
| 2005/0025134 | A1 * | 2/2005 | Armistead | 370/352 |

* cited by examiner

*Primary Examiner*—Thjuan K Addy

(57) ABSTRACT

A method for routing voice data includes establishing a first path between a remote originating node and a gateway using a first channel of a circuit-switched network. The gateway is communicatively coupled to the circuit-switched network and a packet-switched network. A second path is established between an answering node and the gateway using a second channel of the circuit-switched network, if the answering node is remote relative to the packet-switched network. Otherwise the second path is established using the packet-switched network, if the answering node is local to the packet-switched network. The gateway converts any first circuit-switched voice data received on a first channel to packet-switched voice data. Any packet designating an associated remote node is converted to second circuit-switched voice data. The second circuit-switched voice data is communicated to its associated remote node on the second channel.

18 Claims, 6 Drawing Sheets

INTERMEDIATE PACKETIZING OF VOICE DATA FOR COMMUNICATION BETWEEN CIRCUIT-SWITCHED NETWORK NODES

FIELD OF THE INVENTION

This invention relates to the field of communications. In particular, this invention is drawn to communicating voice data between two circuit-switched network nodes via a packetizing gateway.

BACKGROUND OF THE INVENTION

Private branch exchange (PBX) and automated call distributors provide enterprises with digital voice service and centralized connectivity to the public switched telephone network (PSTN). Incoming telephone calls are routed to specific agents through the PBX or call distributor. Agents local to the PBX are connected to the PBX via subscriber equipment such as a telephone.

The call distributor or PBX may support packet-based voice communications for local subscriber equipment. The use of packet based voice communications typically enables the enterprise to integrate voice and data communications over the same physical network. Moreover, the use of packet based voice communications enables inexpensive communication with agents that may be geographically distant from the PBX.

For small geographic areas, a packet based network can offer acceptable quality of service for voice communications. Unfortunately, packets are subject to noticeable delay and loss over larger geographic distances. These delays and losses tend to result in unacceptable quality of service for voice communications over larger geographic areas.

SUMMARY OF THE INVENTION

In view of limitations of known systems and methods, various methods for communicating voice data across one of a circuit-switched network and a packet-switched network are provided.

One method for communicating voice data includes establishing a first path between a remote originating node and a gateway using a first channel of a circuit-switched network. A second path is established between an answering node and the gateway using a second channel of the circuit-switched network, if the answering node is remote relative to the gateway. Otherwise the second path is established using a packet-switched network, if the answering node is local to the gateway.

The gateway converts any received first circuit-switched voice data to packet-switched voice data. Any packet designating a remote node is converted to second circuit-switched voice data. The second circuit-switched voice data is routed to the remote node on the circuit-switched network.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
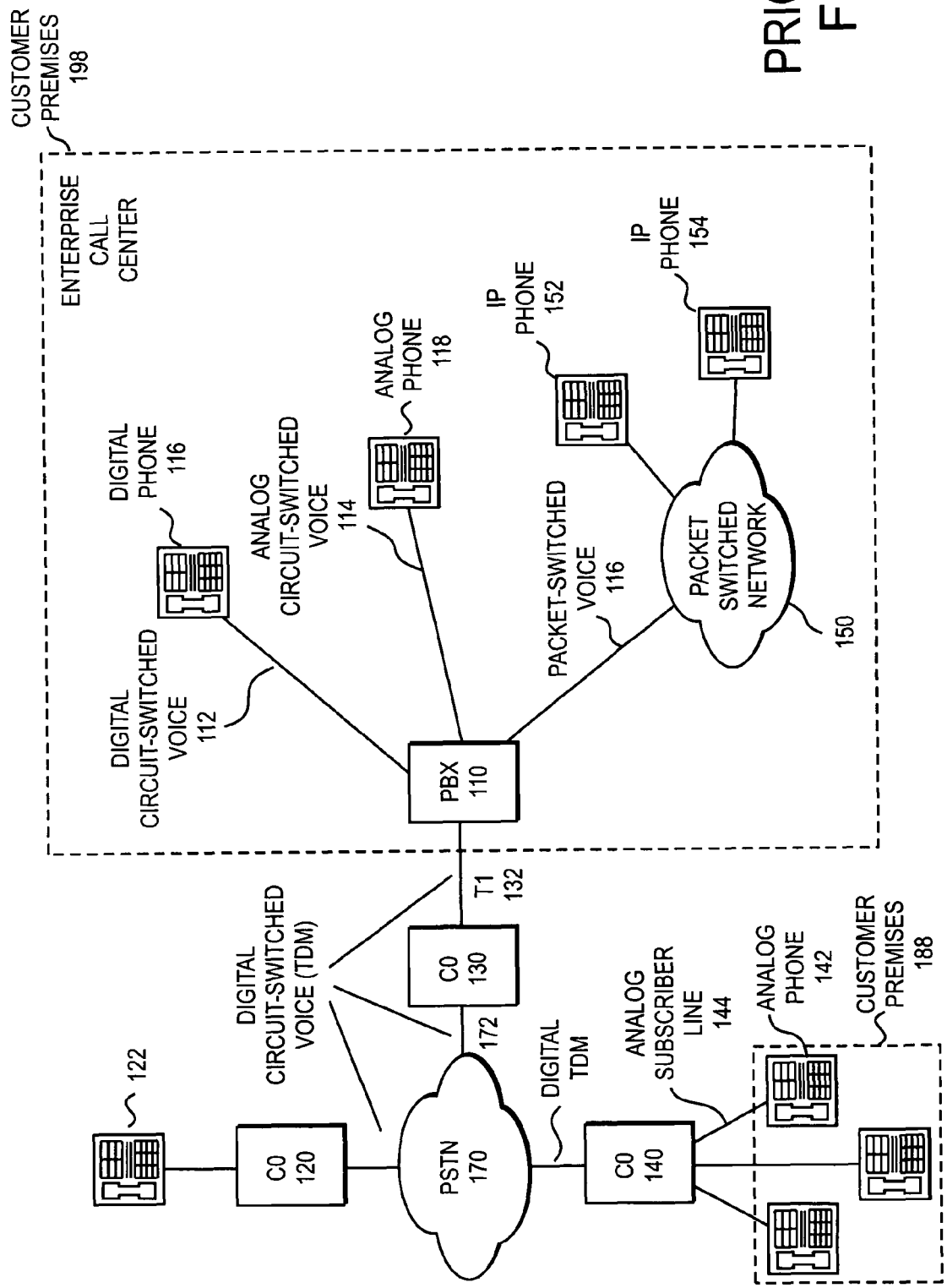
FIG. 1 illustrates subscriber equipment connected to a public switched telephone network.

FIG. 1 illustrates one embodiment of various types of subscriber equipment connected to the public switched telephone network (PSTN) 170. The PSTN 170 is a collection of interconnected systems operated by various telephone companies and entities around the world. The PSTN is largely a digital network except for the final connection to the subscriber equipment which is either analog or digital depending upon subscriber bandwidth requirements.

Central offices 120, 130, and 140 provide an interface between the PSTN and the subscriber equipment such as telephones 122, 142 and PBX 110. The central offices are part of the PSTN, but are identified separately in FIG. 1 for purposes of illustration. The connection 172 between the PSTN and the central office is digital. Voiceband communications between the central offices and the remainder of the PSTN are carried as time division multiplexed (TDM) digital signals. Each time slot represents a different channel on a multichannel digital line 172 between the central office and the remainder of the PSTN 170.

The central office is connected to subscriber equipment located at the customer premises such as customer premises 188 or 198. The connection between the central office and the subscriber equipment is referred to as a subscriber line (e.g., 132, 144).

The subscriber line between the central office and the subscriber equipment (e.g., analog subscriber line 144) may carry information in analog form when a relatively small number of voice circuits are required. Each analog subscriber line 144 is a single voice circuit carrying an analog voiceband signal between the subscriber equipment 142 and the central office 140. Codecs (not illustrated) at the central office digitize the analog voiceband signals from subscriber equipment 142 to be transmitted further upstream to the PSTN 170. The codecs typically sample analog voiceband communications as 8 bit codes at 8000 samples per second resulting in a 64 kb/s data stream. The digitized voiceband communications are then multiplexed onto higher bandwidth digital communication circuits for transmission across the PSTN. The codecs also convert digital codes received from the PSTN into analog voiceband signals for downstream analog subscriber equipment 142.

The connection between the central office and the subscriber equipment carry digital data for supporting a higher number of voice circuits. A T1 digital line 132, for example, can support 24 voice channels. The T1 subscriber line is connected to multi-channel digital subscriber equipment such as a private branch exchange (PBX) 110 or automated call distributor that provides bi-directional conversion between the digitized voiceband data on the T1 subscriber line and the circuit-switched or packet-switched subscriber equipment 116, 118, 152, 154 connected to the PBX.

Regardless of whether the subscriber line between the PSTN and the customer premises is analog or digital in nature, the subscriber line forms a portion of a circuit-switched network. An analog subscriber line represents a single circuit. Each channel or time slot in a multiplexed subscriber line corresponds to a distinct virtual circuit. Once a communication path (i.e., circuit) is established between a call originating node and a call answering node, all voiceband communications between the two follow the same path during the communication session. When a portion of the path is a multi-channel digital subscriber line, all communication between a sender and a receiver use the same time slot or channel on that digital subscriber line. A subsequent session may establish a different path. The PSTN is a circuit-switched network based on a connection-oriented paradigm.

The PBX may provide digital interfaces, circuit-switched analog interfaces, or both. The digital interface may be circuit-switched or packet switched. PBX 110, for example, supports analog subscriber equipment 118 on analog circuit-switched subscriber line 114. The PBX supports digital subscriber equipment 116 on digital circuit-switched subscriber line 112. PBX 110 also provides support for packet-switched subscriber equipment 152, 154 through packet-switched line 156. The packet-switched lines and equipment are inherently digital.

A packet-switched protocol communicates fragments of voiceband communications as individual packets of digital codes. Analog voiceband communications are digitized and divided into groups of codes referred to as packets. The packets are then routed to or from the subscriber equipment.

The packets are then re-assembled in the proper order so that the voice data may be recovered. The ordered packets are then decoded into analog signals for the subscriber equipment.

Packet-switched networks are examples of a connectionless communication paradigm. Transmission Control Protocol/Internet Protocol (TCP/IP), frame relay, and X.25 are examples of popular packet-switched communication protocols.

Packet-switched packets may travel different routes from source to destination during the same communication session. Packet-switched networks must add overhead identifying at least the destination and sequence so that the packets may be properly assembled at the destination. The packets of a packet-switched network may experience significantly different latencies or even losses that are related to the route taken by the packets. As the complexity of the network (i.e., number of possible routes) between source and destination increases, the greater the likelihood that the packet-switched packets take different routes and thus experience different latencies or even losses. Although such latencies are minimal with a smaller network such as a local area network, latencies and losses result in unacceptable quality of service when the packets must travel different routes through heterogenous networks such as the Internet.

Although the finite digital codes appearing in a channel of a circuit-switched network may also be considered to be a "packet", the packets of a packet-switched network do not rely on an established communication path.

Circuit-switched "packets" always travel the same route from source to destination during an established communication session. As a result, the "packets" arrive in the same order sent and usually with substantially the same latencies.

One advantage of a packet-switched network is that the bandwidth for individual senders is variable as opposed to fixed like the individual channels of a circuit-switched network. In addition, communication costs across a packet-switched network such as the Internet tend to be relatively low and independent of the geographic locations of the source and destination.

Circuit-switched networks tend to incur costs related to the geographic locations of the sender and receiver. Generally, packet-switched communications are significantly more economical than circuit-switched communications due in part to the toll structure associated with circuit-switched networks. In addition, given that data networks are typically packet-switched, the use of packet-switched communications enables integrating voice and data onto the same network rather than incurring the capital costs and ongoing maintenance required for distinct networks.

One significant advantage that circuit-switched networks have is that all "packets" are transmitted and arrive in sequence with substantially the same latency. The packets do not have to be re-assembled into a different sequence than they arrived in, nor is data bandwidth reduced for the overhead of such tracking information. This feature of circuit-switched networks is substantially independent of the geographic locations of the source and destination.

Due to the significant advantages of integrated telephony and data networks, voice gateways that provide bi-directional conversion between analog or digital circuit-switched voiceband communications and packets for communication on packet-switched networks have become prevalent.

Figure 2:
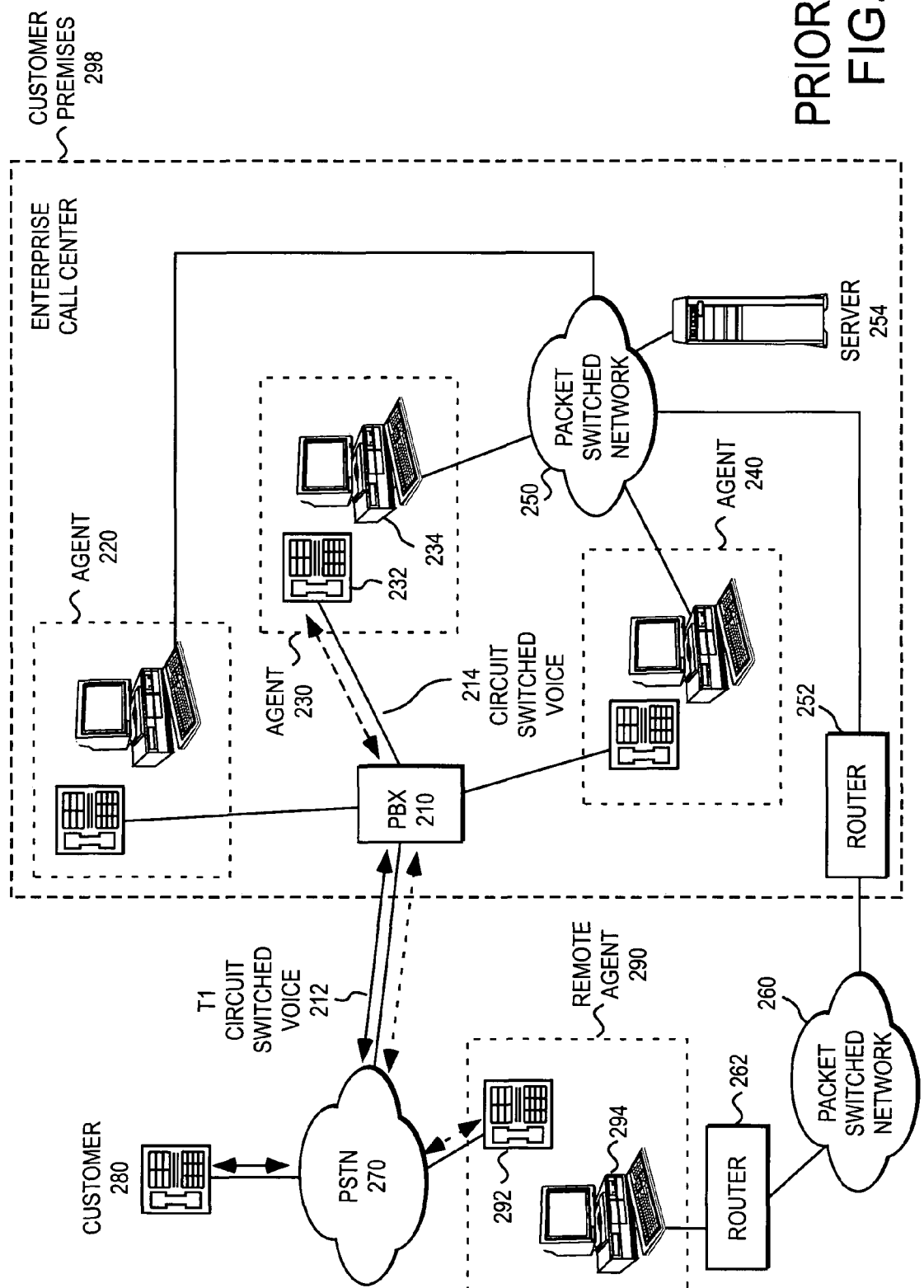
FIG. 2 illustrates one embodiment of an enterprise call center with distinct voice and data networks.

FIG. 2 illustrates one embodiment of a prior art system having separate networks for voice communications (telephony) and data. A customer 280 may initiate contact with an agent 230. The telephone call is routed on the circuit-switched network through the PSTN 270 to PBX 210 and then to subscriber equipment 232 of agent 230. The agent and customer subscriber equipment are referred to as nodes of the communication path between the agent and customer. Agent 230 may access information pertinent to the customer by accessing computer terminal 234. Computer terminal 234 is connected to information server 254 through a packet-switched network 250. Bi-directional communication between the agent and customer uses only a single channel of subscriber line 212 of the circuit-switched portion of the communication path.

Typically the PBX 210 supports communication with agents remote from the call center. The customer 280 contacts the enterprise through PBX 210. PBX 210 then establishes a communications path to subscriber equipment 292 of remote agent 290.

Remote agent 290 can access information pertinent to the customer by using computer terminal 294 to access information server 254. Typically the agent and the enterprise both have access to a common packet-switched network 260 such as the Internet. The agent and the enterprise are connected to the common packet-switched network 260 through routers 262 and 252, respectively. Voice communication between remote agent and the customer requires two channels of the PBX. If analog subscriber lines are used, each channel corresponds to a separate analog line such that two analog lines are required. Thus, communication between a customer 280 and a remote agent 290 through PBX 210 requires twice the circuit capacity of the PBX compared to communication between customer 280 and agents 220, 230, 240 local to the PBX.

Regardless of whether the agent is remote or local to the enterprise, the voice and data networks are separate. Within the enterprise, voice communications are carried by a circuit-switched network and the data communications are carried by a separate packet-switched network resulting in increased maintenance requirements to support multiple networks.

Figure 3:
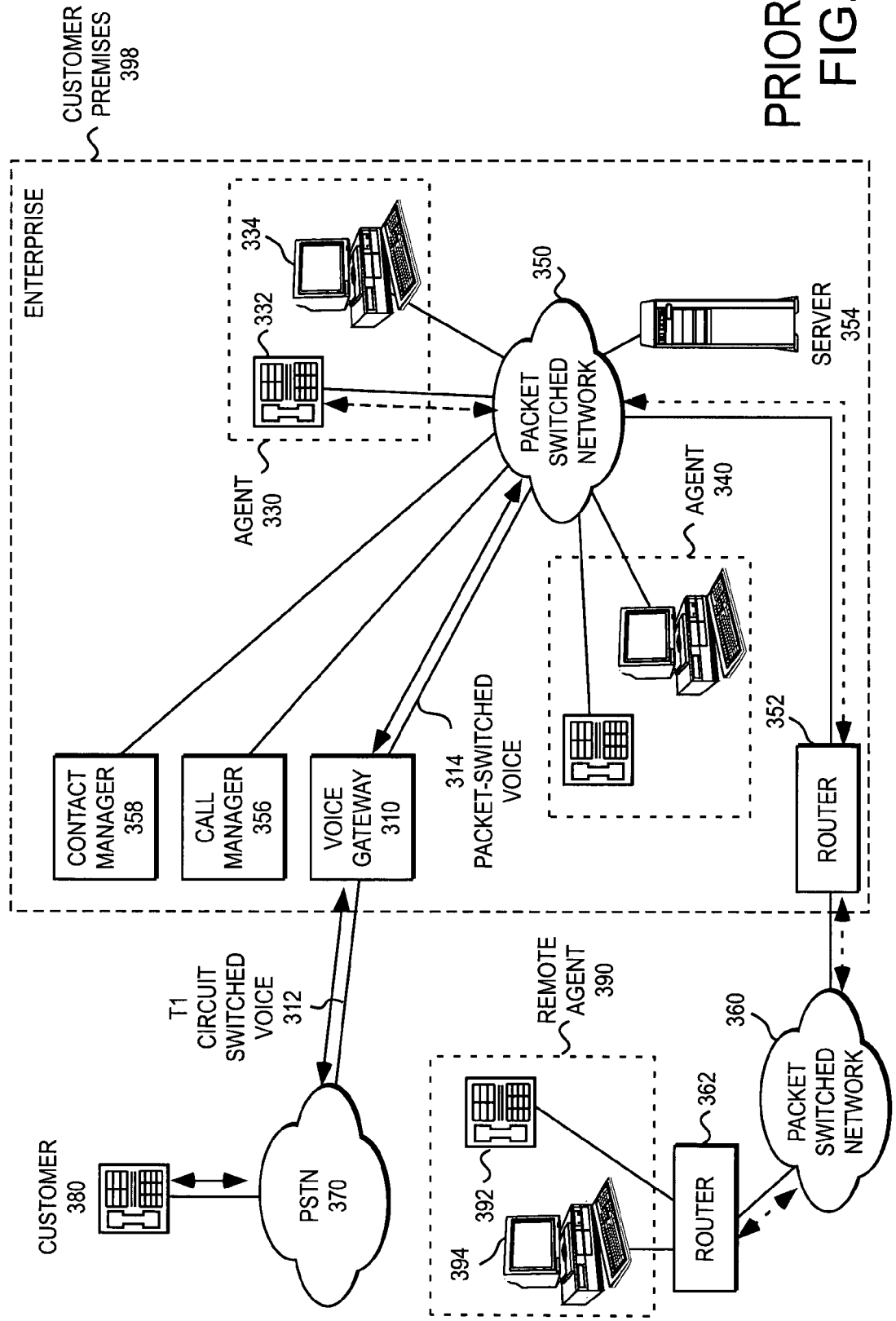
FIG. 3 illustrates one embodiment of an enterprise call center with an integrated voice and data network.

FIG. 3 illustrates one embodiment of a prior art system having integrated voice and data networks. Calls from any customer such as customer 380 are routed along a circuit-switched network such as PSTN 370 to voice gateway 310. Voice gateway 310 provides bidirectional conversion of voice communications between the telephone company circuit-switched network and the enterprise packet-switched network 350. Call manager 356 provides switch functionality for maintaining the communication path between nodes corresponding to the customer and agent subscriber equipment.

Contact manager 358 provides intelligent routing functions. In particular, if an agent is not otherwise explicitly identified by the caller (e.g., by extension number, direct dial, etc.) then an agent may be assigned by the contact manager 358 to handle the call. The agent may be assigned according to rules designed to achieve particular business goals.

For example, the agent may be assigned in a manner to reduce the caller's wait time (i.e., first available agent). The agent may be assigned based on the geographic region or the particular number that the call originates from. The rules may be designed to achieve load leveling between agents when more than one agent is available.

Agents 330 and 340 have packet-switched subscriber equipment connected to packet-switched network 350. A telephone that supports a packet-switched interface is typically referred to as an "IP phone" (Internet Protocol phone). The same packet-switched network is used for data communications as well. Agent 330, for example, may access information server 354 to access data pertinent to customer 380 through packet-switched network 350. Agent 330, also communicates with customer 380 using IP phone 332 which is connected to voice gateway 310 through packet-switched network 350.

Communication between remote agent 390 and customer 380 is also supported through packet-switched network 350. The agent and the enterprise both have access to a common packet-switched network 360 such as the Internet. The agent and the enterprise are connected to the common packet-switched network 360 through routers 362 and 352, respectively. Remote agent 390 accesses packet-switched network 350 for both data and voice communications.

From the enterprise viewpoint, packet-switched network 350 represents an integrated voice and data network. The enterprise need only support and maintain a single network for local and remote agents rather than the separate voice and data networks of FIG. 2. Although packet-switched communications may suffer from latency, loss, etc., the effects are negligible for networks such as packet-switched network 350 that span relatively small geographic areas or whether the packet-switched network is controlled by the enterprise. Unfortunately, the reduction in quality of service introduced by the common packet-switched network 360 (e.g., Internet) for communicating with the remote agent is frequently unacceptable for voice communications. Packet latency, for example, may vary significantly on packet-switched network 360 due to its geographic extent or heterogenous composition.

Figure 4:
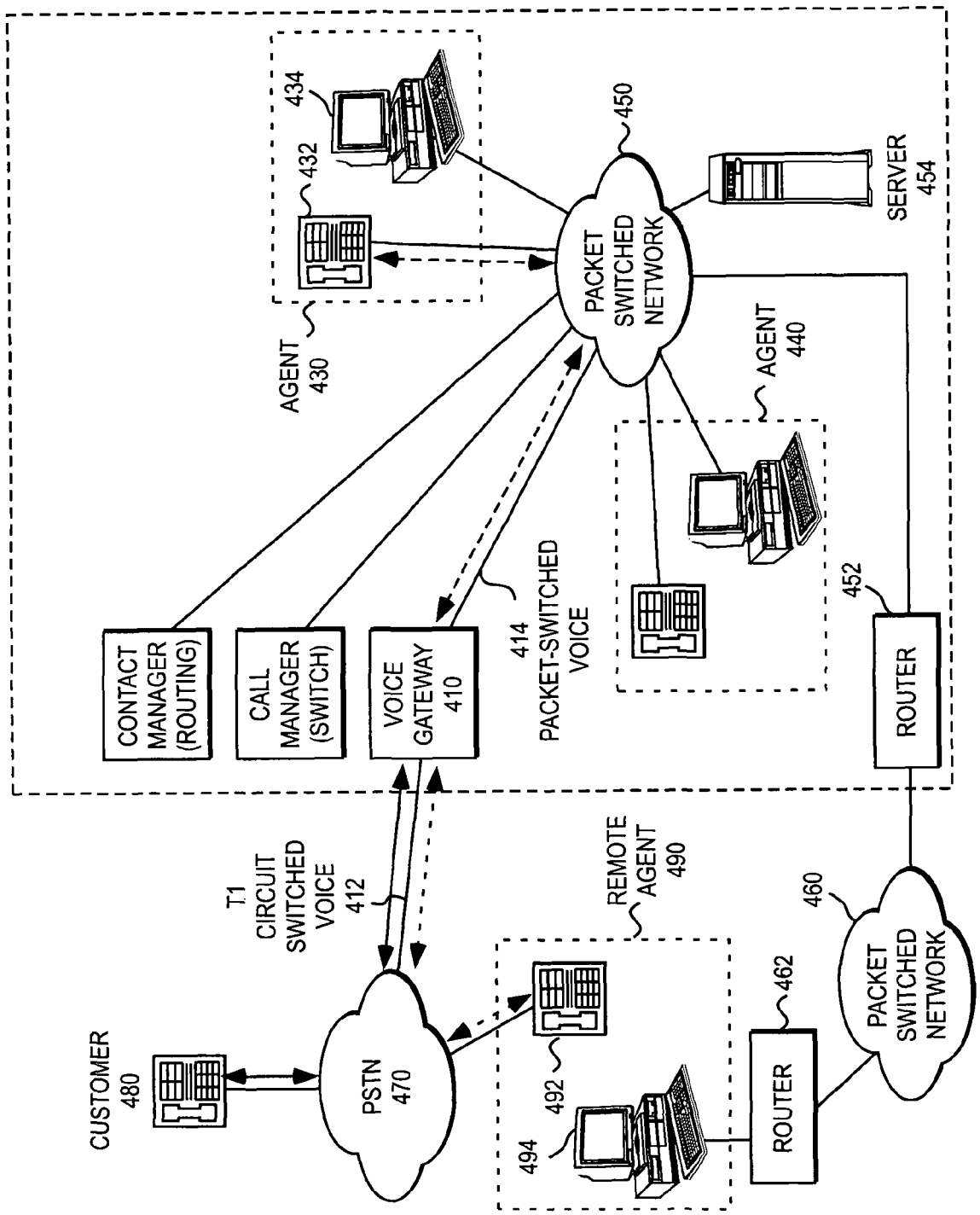
FIG. 4 illustrates one embodiment of an enterprise call center with an integrated voice and data network for local agents and distinct voice and data networks for remote agents.

FIG. 4 illustrates routing voiceband communications over one of a circuit-switched network and a packet-switched network. Briefly, local agents use a packet-switched network for integrated voice and data communications. Remote agents, however, use a traditional circuit-switched network for voice communications and a packet-switched network for data communications.

Communication between customer 480 and local agent 430 travels through the circuit-switched PSTN 470 to voice gateway 410. Voice gateway 410 converts inbound circuit-switched voice communications into packets for packet-switched network 450. The packet-switched voice data is then routed to agent 430 across packet-switched network 450.

Agent 430 communicates with the customer using packet-switched subscriber equipment such as IP phone 432. Agent 430 access data pertinent to customer 480 using computer terminal 434 which is connected to information server 454 through the same packet-switched network 450.

Outbound communications are routed from the agent through packet-switched network 450 to the voice gateway 410. Voice gateway 410 converts the packets into a form suitable for circuit-switched network of the PSTN which routes the outbound circuit-switched voice data to the customer 480.

Communications between customer 480 and remote agent 490 are handled differently. Communications between the gateway 410 and the customer 480 are carried on a first channel of the circuit-switched network 470. Communications between remote agent 490 and the gateway are carried on a second channel of the circuit-switched network 470.

Voice gateway 410 converts circuit-switched voice data from either the remote agent or the customer to packet-switched voice data as it does with all inbound circuit-switched voice data. Packet-switched packets designated for remote agents or customers, however, are converted back into a format suitable for the circuit-switched PSTN. The converted circuit-switched voice data is then routed across the circuit-switched PSTN to the designated recipient.

Agent 490 accesses data pertinent to the customer from information server 454. Agent 490 accesses information server 454 using computer terminal 494 for data pertinent to the customer. The agent computer terminal 494 is connected to a common packet-switched network 460 through router 462. The enterprise packet-switched network is connected to a common packet switched network 460 such as the Internet through router 452.

The system illustrated in FIG. 4 permits the enterprise to benefit from an integrated voice and data network for agents local to the enterprise. Although the packets of packet-switched network 450 may experience different latencies, typically the latencies are negligible for smaller or less complex networks. Quality of service issues that stem from more complex, heterogeneous packet-switched networks such as the Internet are eliminated by using the circuit-switched network to handle voice communications with remote agents. Circuit-switched voice data is thus routed to a destination node on one of a packet-switched or a circuit-switched network based on the location of the destination relative to the gateway.

Figure 5:
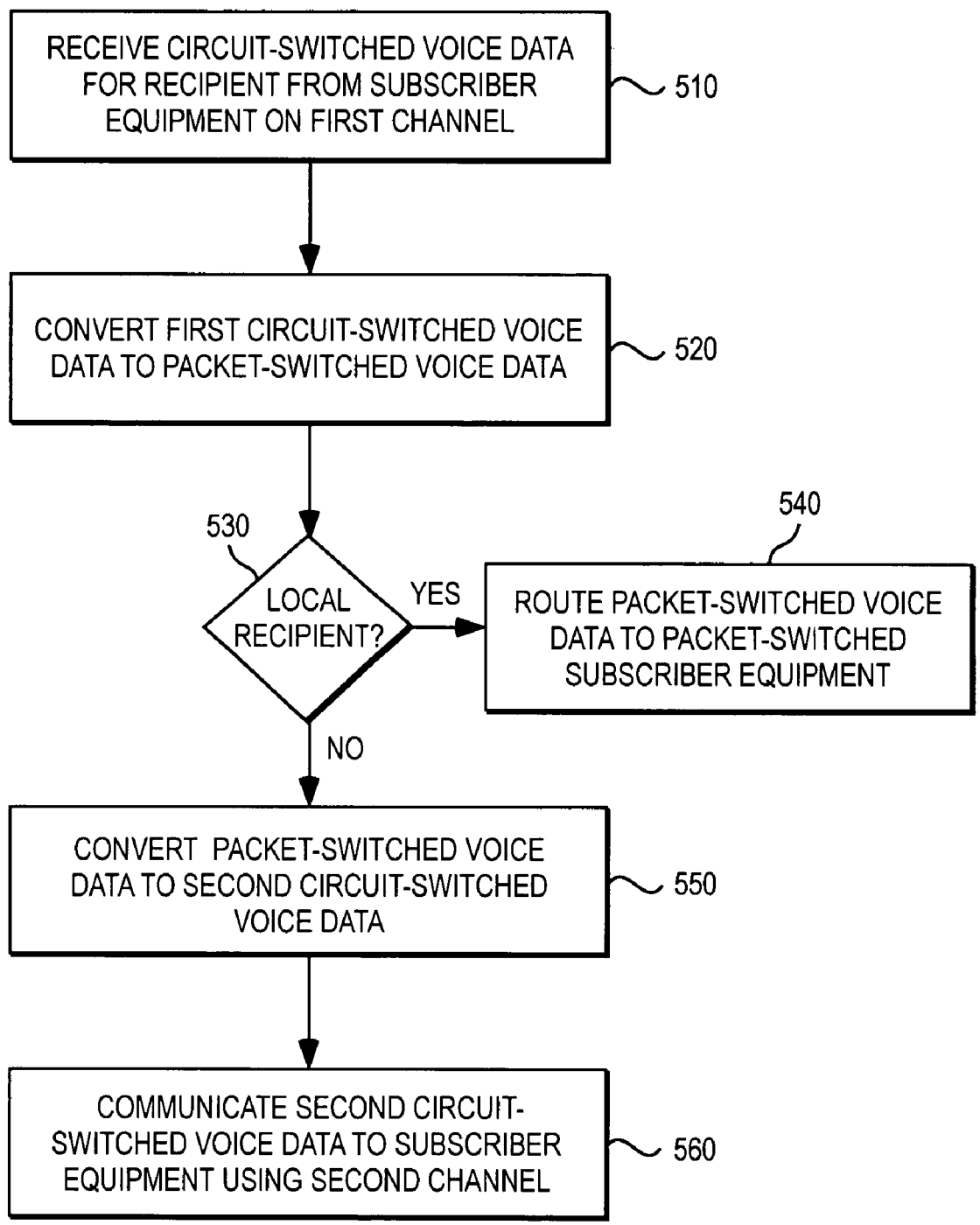
FIG. 5 illustrates one embodiment of a method for routing voice communications over one of a packet-switched and a circuit-switched network.

FIG. 5 illustrates one embodiment of a method for routing voiceband communications over one of a packet-switched and a circuit-switched network. First circuit-switched voice data for a recipient is received from subscriber equipment on a first channel of a circuit-switched network in step 510.

The circuit-switched voice data is converted into packet-switched voice data in step 520. Step 530 determines whether the designated recipient is local. This may be determined, for example, by the telephone extension, internet protocol address, or other identifying geographic information for the recipient. The recipient may be a remote agent or customer, for example.

If the recipient is local to the gateway, the packet-switched voice data is communicated across a packet-switched network to the recipient in step 540. If the recipient is not local, the packet-switched voice data is converted back into circuit-switched voice data referred to as second circuit-switched voice data in step 550. The terms "first" and "second" or "converted" are used to emphasize that the first circuit-switched voice data is not simply forwarded. The second circuit-switched voice data is a reproduction of the first circuit-switched voice data after an intermediate packetizing process.

The second circuit-switched voice data is communicated to subscriber equipment on a second channel of the circuit-switched network in step 560. The second channel is distinct from the first channel so that bidirectional communication in the case of a remote recipient requires two channels of the circuit-switched network.

The term "circuit-switched voice data" is intended to refer to either analog or digital voiceband communications carried by a circuit-switched network. In the case of analog subscriber lines, the "channel" identifies a specific analog subscriber line and the "voice data" is the analog voiceband communications carried by the specific analog subscriber line.

In the case of digital subscriber line(s), "channel" refers to a specific channel or time slot of a time division multiplexed digital subscriber line. "Voice data" refers to the digital information contained in the time slot associated with the channel.

The method of FIG. 5 requires two analog subscriber lines, or two channels of a digital subscriber line, or one analog subscriber line and one channel of a digital subscriber line to handle the communication path because the source and the destination are using separate channels of a circuit-switched network.

Either the customer or the agent may initiate a call to the other. Remote agents may contact customers directly or through the voice gateway. The method of FIG. 5 is intended to refer to communications that follow a communications path originating within a circuit-switched network, passing through the voice gateway, and terminating within the circuit-switched network. The contact manager or call manager are inherently aware of whether a call is originating from the circuit-switched network or the packet-switched network at the time a communication path is being established.

At the time the communication path is being established, the call manager or contact manager must determine whether the caller is attempting to reach subscriber equipment that is local to the voice gateway, or whether the caller is attempting to reach subscriber equipment that is not local to the voice gateway. Although illustrated in FIGS. 3 and 4 as distinct components, the functionality of the call manager, gateway, and contact manager may be combined into fewer components in alternative embodiments.

Agents and customers are generically referred to as communication nodes. A node may be communicatively coupled to the gateway through the circuit-switched network, the packet-switched network, or both. For purposes of discussion, calls originating from any node of the circuit-switched network to the gateway are classified as "remote".

A communication path is established between a call originating node and a call answering node. The call answering node may be specifically identified from information provided by the call originating node. For example, an agent may use a call transfer function of a call manager (i.e., communication path switch) to provide the call manager with the telephone number of the customer to be called. Similarly, a customer may use an agent's extension or "enterprise direct number" to specify a particular agent. An "enterprise direct number" is a telephone number for establishing a communication path through the voice gateway to a specific agent.

Alternatively, the call answering node may be assigned by a contact manager based on factors such as agent availability, load leveling between agents, identity of the caller (as determined by the caller's telephone number from Dialed Number Information Service), or some other attribute.

The call answering node may be designated a "local" or "remote" node based on pre-determined accessibility to the enterprise packet-switched network. Typically agents must login to sophisticated call handling systems. The agent's remote or local status may be determined by the login identity or the location provided by the agent at the time of login.

Agents may have access, customers are presumed not to have access at least for the purposes of establishing the telephone call. The local or remote status may be inferred at least in part from the telephone number associated with assigned call answering node. If the telephone number of the call answering node appears on a lookup table accessible by the call manager or contact manager, then a designated classification may be extracted from the table, otherwise the answering node is presumed remote.

Figure 6:
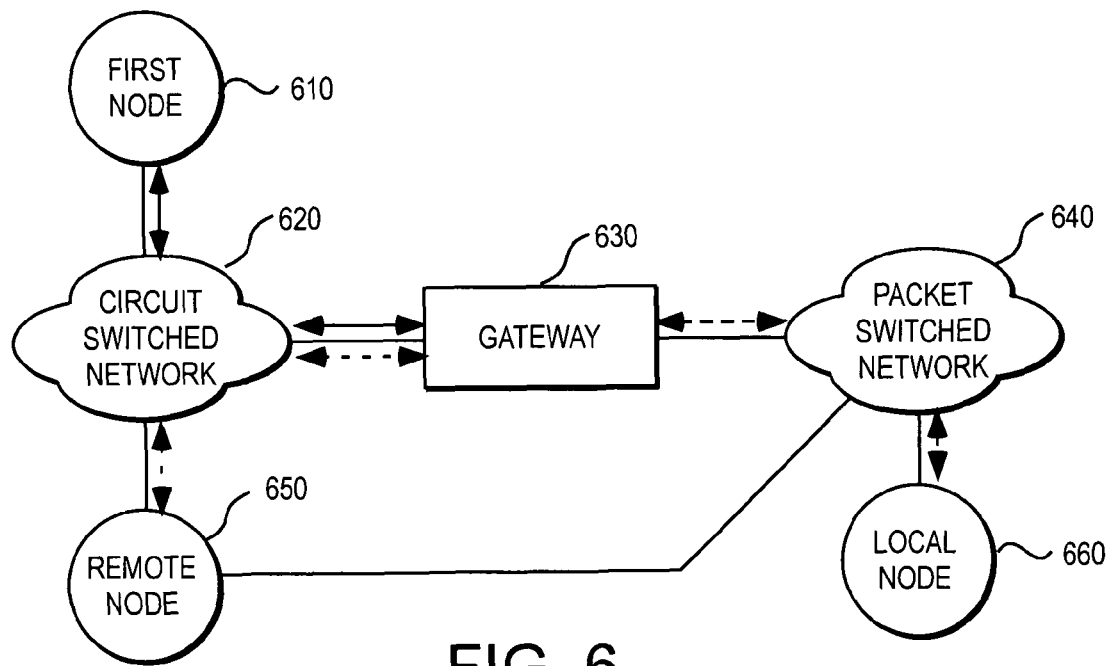
FIG. 6 illustrates a plurality of nodes communicatively coupled to a gateway through at least one of a circuit-switched network, a packet-switched network, or both.
Figure 7:
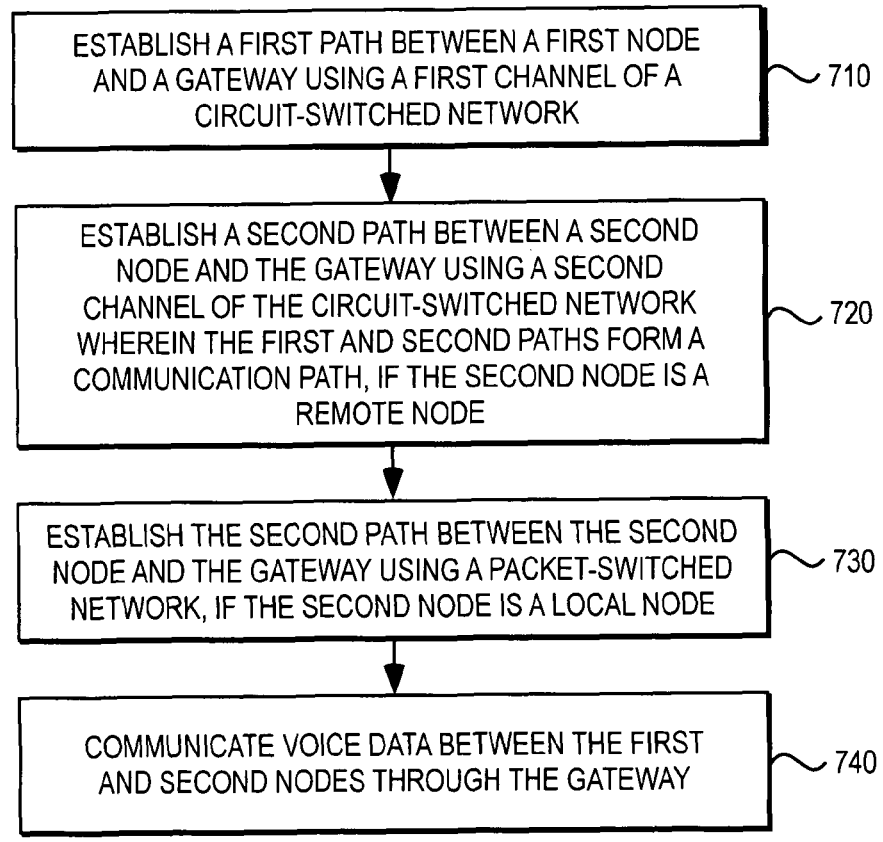
FIG. 7 illustrates a method for routing voice communications across a selected one of a circuit-switched network and packet-switched network.

FIGS. 6-7 illustrate methods and apparatus for communicating voiceband data over a selected one of a circuit-switched and a packet-switched network without obscuring the principles with detailed network components such as routers, central offices, etc.

A plurality of nodes is connected to the gateway 630 through either a circuit-switched network 620, a packet-switched network 640, or both. "Node" is not limited to a single defined component. Node may refer to a localized area or physical location. An agent at node 650, for example, may have a telephone for communicating with gateway 630 via circuit-switched network 620 and a computer for communicating with the gateway via packet-switched network 640. In the illustrated embodiment, a connection to the gateway could be made across either network from the agent's location or node.

A call originating node initiating contact with the gateway across the circuit-switched network is classified as a remote node. Even if packet-switched communications with the call originating node were possible, the caller precluded such a possibility by initiating the call using the circuit-switched network. Any node that is not local to the gateway as determined by its telephone number, pre-determined status, address on the packet-switched network, lack of any connection to the packet-switched network, or lack of a known connection to the packet-switched network is similarly classified as a remote node.

A connection between a remote first node and the gateway using a first channel of the circuit-switched network is established in step 710. A connection between the gateway and a second node is established using a second channel of the circuit-switched network in step 720, if the second node is a remote node. The first and second channels are distinct from each other.

In step 730, the gateway is communicatively coupled to the second node using the packet-switched network, if the second node is local to the packet-switched network. Voice data is communicated between the first and second nodes through the gateway in step 740.

The gateway converts all voice data from the circuit-switched network (first circuit-switched voice data) into packet-switched voice data. The gateway converts packet-switched voice data into second circuit-switched voice data for any packet designating one of the remote nodes as a recipient. The second circuit-switched voice data is communicated to the appropriate recipient across the circuit-switched network. A call manager or communication switch maintains the communication path definition for the duration of the communication session between the first and second nodes.

In general a methods and apparatus for communicating voice data between a call originating node and a call answering node through a gateway are described. A connection between the call originating node and the gateway is established on a first channel of the circuit-switched network. A connection between the call answering node and the gateway is established using a second channel of the circuit-switched network, if the second node is remote from the gateway. Alternatively, communication between the call answering node and the gateway is established using a packet-switched network, if the call answering node is local to the packet-switched network.

In the preceding detailed description, the invention is described with reference to specific exemplary embodiments thereof. Methods and apparatus for communicating between nodes on at least one of a circuit-switched network, a packet-switched network, or both through a packetizing gateway are described. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of routing voice communications, comprising:
    establishing a first path between a remote originating node and a gateway using a first channel of a circuit-switched network, wherein the gateway is communicatively coupled to the circuit-switched network and a packet-switched network;
    establishing a second path between an answering node and the gateway using a second channel of the circuit-switched network if the answering node is remote relative to the gateway, wherein the first and second paths collectively form a bi-directional communication path;
    converting first circuit-switched voice data received from the circuit-switched network on the first channel into packet-switched voice data;
    converting the packet-switched voice data into second circuit-switched voice data for any packet designating the remote answering node as a destination node; and
    routing the second circuit-switched voice data to the remote destination node across the circuit-switched network on the second channel.

2. The method of claim 1 further comprising:
    establishing the second path between the answering node and the gateway using the packet-switched network, if the answering node is local relative to the packet-switched network.

3. The method of claim 1 further comprising:
    communicating voice data between the first and second nodes through the gateway.

4. The method of claim 1 wherein at least one of the originating and answering nodes is circuit-switched subscriber equipment comprising a selected one of a telephone, modem, and facsimile apparatus.

5. A method of routing voice communications between first and second nodes of a communication system, comprising:
    converting first circuit-switched voice data received from a remote first node on a first channel of a circuit-switched network to packet-switched voice data;
    determining whether the second node is local to a gateway;
    in response to determining the second node is local to the gateway, routing the packet-switched voice data to the second node on a packet-switched network;
    determining whether the second node is a remote node that is not local to the gateway;
    in response to determining the second node is the remote node not local to the gateway, converting the packet-switched voice data into second circuit-switched voice data; and
    routing the second circuit-switched voice data to the remote second node across the circuit-switched network.

6. Apparatus for communicating between two nodes of a communication system, comprising:
    a gateway using a first channel of a circuit-switched network to communicate between the gateway and a remote first node, and the gateway is communicatively coupled to the circuit-switched network and a packet-switched network,
    the gateway using a second channel of the circuit-switched network to communicate with a remote second node that is remote relative to the gateway,
    wherein the gateway converts first circuit-switched voice data received from the remote first node on the first channel of the circuit-switched network to packet-switched voice data,
    wherein the gateway converts the packet-switched voice data to second circuit-switched voice data for any packet designating the remote second node, wherein the gateway communicates the second circuit-switched voice data to the remote second node using the second channel of the circuit-switched network.

7. The apparatus of claim 6, wherein the packet-switched voice data is routed to a local second node using the packet-switched network for any packet designating the local second node.

8. The apparatus of claim 6 wherein at least one of the first and second nodes is communicatively coupled to the gateway through both the circuit-switched network and the packet-switched network.

9. The apparatus of claim 6 wherein the first channel carries analog data on an analog subscriber line.

10. The apparatus of claim 6 wherein the first channel carries digital data on a digital subscriber line.

11. The apparatus of claim 10 wherein the digital subscriber line is time division multiplexed.

12. The apparatus of claim 6 wherein the first channel defines a connection between the gateway and subscriber equipment of the first node, wherein the subscriber equipment is a selected one of a modem, telephone, and facsimile apparatus.

13. Apparatus for communicating between first and second nodes of a circuit-switched network coupled to a packet-switched network, comprising:
    gateway conversion means for bi-directional conversion of voice data between the circuit-switched network and the packet-switched network, wherein the gateway conversion means is communicatively coupled to the first node using a first channel of the circuit-switched network, wherein the gateway conversion means is communicatively coupled to the second node using a second channel of the circuit-switched network, wherein the gateway conversion means converts first circuit-switched voice data originating from one of the first and second nodes into packetized voice data; and
    routing means for routing packetized data, wherein the routing means routes packetized voice data on the packet-switched network, designating one of the first and second nodes as a destination node to the gateway conversion means, if the destination node is determined to be local to the gateway conversion means, wherein the gateway conversion means converts the received packetized voice data to second circuit-switched voice data if the destination node is determined to be remote from the gateway conversion means, wherein the gateway conversion means communicates the second circuit-switched voice data to one of the first and second nodes using a corresponding one of the first and second channels in accordance with the identity of the designated node.

14. The apparatus of claim 13 wherein at least one of the first and second nodes is communicatively coupled to the gateway through both the circuit-switched network and the packet-switched network.

15. The apparatus of claim 13 wherein the first channel carries analog data on an analog subscriber line.

16. The apparatus of claim 13 wherein the first channel carries digital data on a digital subscriber line.

17. The apparatus of claim 16 wherein the digital subscriber line is time division multiplexed.

18. The apparatus of claim 13 wherein the first channel defines a connection between the gateway conversion means and subscriber equipment of the first node, wherein the subscriber equipment is a selected one of a modem, telephone, and facsimile apparatus.

* * * * *